United States Patent [19]

Kimbrough

[11] Patent Number: 5,140,791
[45] Date of Patent: Aug. 25, 1992

[54] LIMITED ACCESS FEEDER RACEWAY

[75] Inventor: Robert L. Kimbrough, Oxford, Ohio

[73] Assignee: Square D Company, Palatine, Ill.

[21] Appl. No.: 584,374

[22] Filed: Sep. 17, 1990

Related U.S. Application Data

[63] Continuation of Ser. No. 313,699, Feb. 22, 1989, abandoned.

[51] Int. Cl.⁵ .............................................. E04B 5/48
[52] U.S. Cl. ................................. 52/221; 52/126.2; 52/220
[58] Field of Search .................. 52/220, 221, 126.2, 52/334, 336

[56] References Cited

U.S. PATENT DOCUMENTS

| Re. 26,814 | 3/1970 | Hudson | 52/221 |
|---|---|---|---|
| 2,931,533 | 4/1960 | Wiesmann | 220/3.4 |
| 3,530,627 | 9/1970 | Carter et al. | 52/221 |
| 3,550,336 | 12/1970 | Halkovich et al. | 52/127 |
| 3,721,051 | 3/1973 | Fork | 52/173 |
| 3,793,793 | 2/1974 | Dobbins | 52/221 |
| 3,844,440 | 10/1974 | Hadfield et al. | 220/3.7 |
| 3,886,702 | 6/1975 | Fork | 52/221 |
| 4,040,755 | 8/1977 | Jorgensen et al. | 52/126.2 |
| 4,194,332 | 3/1980 | Fork | 52/220 |
| 4,517,777 | 5/1985 | Calhoun | 52/220 |
| 4,584,803 | 4/1986 | Ryan | 52/221 |
| 4,593,507 | 6/1986 | Hartman | 52/221 |
| 4,594,826 | 6/1986 | Gray | 52/221 |
| 4,627,203 | 12/1986 | Presswalla et al. | 52/221 |
| 4,781,001 | 11/1988 | Ryan | 52/220 |

OTHER PUBLICATIONS

Exhibit A-Brochure of Mac-Fab Products of St. Louis, Mo.

Exhibit B-Portion of catalog of Square D Company, p. 24, Jul., 1983.

*Primary Examiner*—Michael Safavi
*Attorney, Agent, or Firm*—D. Russell Stacey; L. Wayne Beavers

[57] ABSTRACT

A floor construction includes a metal floor decking having a plurality of parallel multi-cell cellular metal floor raceways each of which includes at least one cell for high voltage power wiring. This one cell has a first wiring opening defined in a top thereof. A limited access feeder raceway transversely spans and rests upon the cellular metal floor raceways. The feeder raceway includes an enclosed first wiring raceway separating bottomless second and third wiring raceways. The enclosed first wiring raceway has a plurality of spaced second wiring openings defined through a bottom thereof, one of said second wiring openings being located directly above and in registry with each of the first wiring openings. The feeder raceway includes a closed top having a plurality of spaced access openings defined therethrough, one of which access openings is located directly above each of the second wiring openings. A plurality of access units are mounted upon the feeder raceway, one being associated with each access opening. The access units extend upward from the closed top of the feeder raceway to about a floor level for providing access downward through the access openings into the first, second and third wiring raceways of the limited access feeder raceway and into the cells of the multi-cell cellular metal floor distribution raceways. A concrete floor is poured on top of the metal floor decking and over the closed top of the limited access feeder raceway up to the floor level. An alternative two cell bottomless limited access feeder raceway is also disclosed.

9 Claims, 3 Drawing Sheets

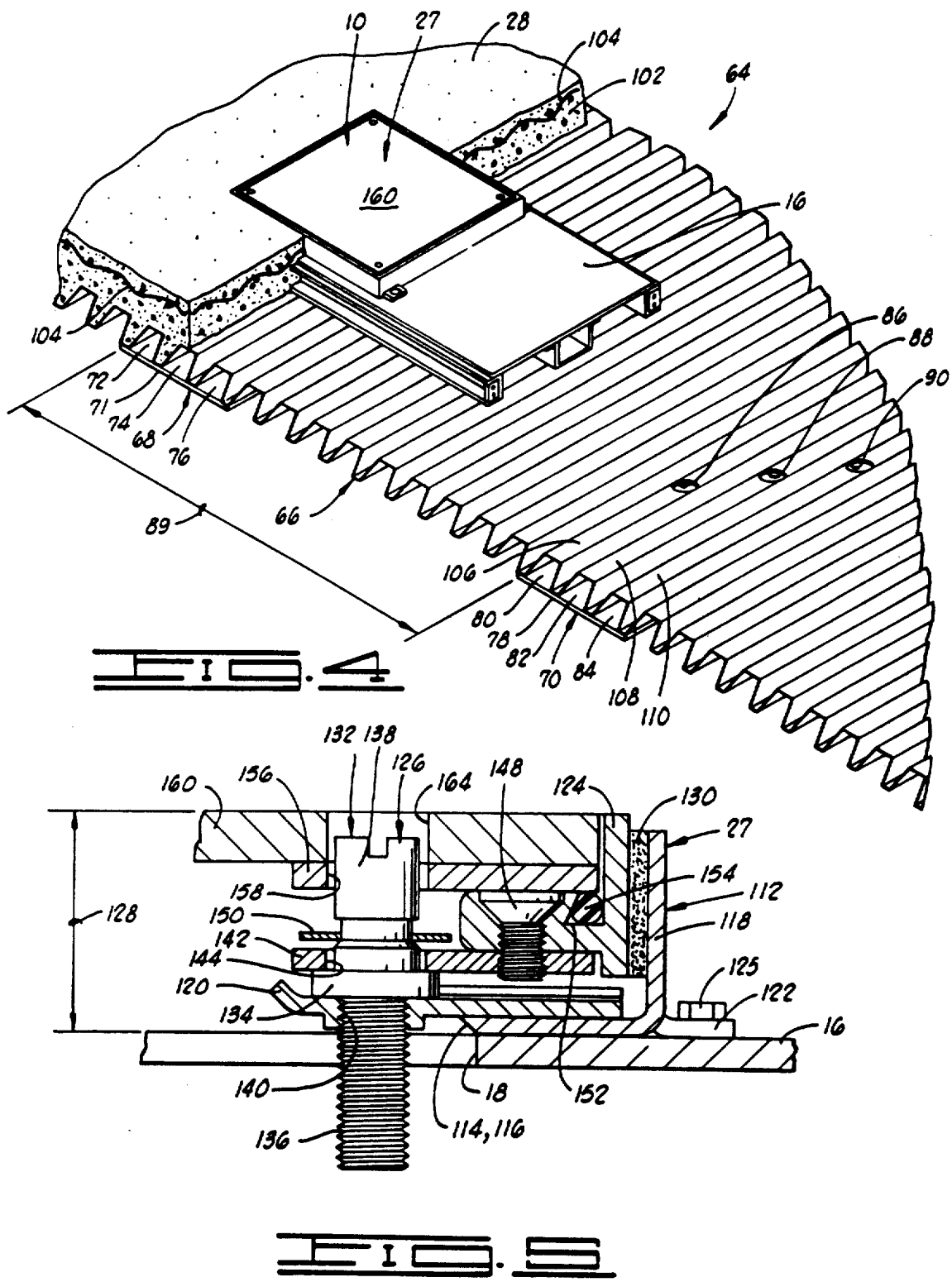

LIMITED ACCESS FEEDER RACEWAY

This is a continuation of copending application Ser. No. 07/313,699 filed on Feb. 22, 1989, now abandoned.

This invention relates generally to raceway systems designed to be placed in a floor, and more particularly, but not by way of limitation, to a limited access feeder raceway designed for use with cellular metal floor distribution raceways.

BACKGROUND OF THE INVENTION

There are several well known types of electrical raceway systems which are designed to be placed in a floor. There are, for example, "underfloor raceways" as defined in Article 354 of the National Electrical Code and "cellular metal floor raceways" as defined in Article 356 of the National Electrical Code. Raceway components designed for use in either of the two mentioned raceway systems, and conceivably in some other systems, can generally be referred to as raceway apparatus for placement in a floor.

As used herein, the simple term "raceway" or the phrase "raceway apparatus to be placed in a floor", or the like are intended to refer in a generic sense to raceway systems which may be used as part of an "underfloor raceway" or of a "cellular metal floor raceway" or both. Where the term "cellular metal floor raceway" is used, it is intended as a reference to the particular type of system defined in Article 356 of the National Electrical Code.

The raceway system disclosed in this application is designed primarily as a limited access feeder raceway for use in conjunction with a cellular metal floor raceway. It can conceivably, however, be utilized in other ways, and thus is generally referred to as a raceway apparatus to be placed in a floor.

The floors of buildings are commonly constructed with a corrugated metal floor decking over which a concrete floor is poured. The metal floor decking will typically have portions thereof provided with a bottom plate so that the corrugations of the metal decking along with the bottom plate define enclosed cells in which electrical wiring can be placed. Typically, three adjacent corrugations will be enclosed on the bottom to form three parallel cells which are referred to as a multi-cell cellular metal floor raceway.

Typically, such multi-cell cellular metal floor raceways will be placed at intervals of approximately six feet so that the cellular metal floor decking includes a system of parallel cellular metal floor raceways which extend across the width of the floor and are spaced at intervals of approximately six feet along the length of the floor.

The cellular metal floor raceways defined within the metal decking are typically used as the distribution ducts for the electrical supply system.

Additionally, a feeder raceway is typically laid across the top of the cellular metal flooring transversely to the direction of the cellular metal floor raceways. Generally, a raceway construction known as trench duct is utilized for the feeder raceway. A typical trench duct utilized with cellular metal flooring is shown in U.S. Pat. No. 3,886,702 to Fork. The trench duct lies across the top of the cellular metal flooring and it extends upward to the top floor level. A removable cover plate typically spans the trench duct and defines a portion of the floor. The trench duct is utilized to feed electrical cables to the various cellular metal floor raceways.

Trench duct typically has been provided with one of two basic designs. The trench duct can either be bottomless as shown in U.S. Pat. No. 3,886,702 to Fork, or the trench duct can include a bottom plate which has access openings which must be aligned with access openings in the cellular metal flooring.

A number of problems are inherent in the use of trench duct to feed cellular metal floor raceways. Trench duct is typically noisy to walk on and often gives an undesirable springy, spongy feeling under foot.

Additionally, the cover plate which spans the trench duct tends to bow from floor loading and often causes the floor finish to crack and break at the trim edges of the trench duct.

Additionally, since the trench duct extends vertically through the entire depth of the concrete slab, it prevents the use of structural wire mesh or other reinforcing to strengthen the slab at the location of the trench duct.

One alternative to conventional trench duct is the use of a limited access feeder duct. The limited access feeder ducts previously available have utilized a completely enclosed multi-cell duct having access openings in the bottom thereof for alignment with access openings in the cellular metal floor raceways. Access units mounted on the top of the limited access duct extend upward to the floor level to provide access to the feeder duct and the underlying cellular metal floor raceways at selected locations along the length of the feeder duct. One such system is that marketed as the Mac-Fab system of Mac-Fab Products of St. Louis, Mo.

The present invention provides an improved construction for such a limited access feeder raceway designed for use with cellular metal floor raceways.

SUMMARY OF THE INVENTION

An improved floor construction including a cellular metal floor decking with a limited access feeder raceway system is provided.

The cellular metal floor decking includes a plurality of parallel multi-cell cellular metal floor raceways each including at least one cell for high voltage power wiring, said one cell having a first wiring opening defined in a top thereof.

The limited access feeder raceway transversely spans and rests upon the cellular metal floor raceways of the metal floor decking. The limited access feeder raceway includes an enclosed first wiring raceway separating bottomless second and third wiring raceways.

The enclosed first wiring raceway has a plurality of spaced second wiring openings defined through a bottom thereof. One of these second wiring openings is located directly above and in registry with each one of the first wiring openings.

The limited access feeder raceway has a closed top plate having a plurality of spaced access openings defined therethrough. One of the second wiring openings is located below each of the access openings.

A plurality of access means are associated with the limited access feeder raceway, one being associated with each access opening. Each access means extends upward from the closed top of the limited access feeder raceway to about a floor level, for providing access downward through the access openings into the first, second and third wiring raceways and into the cells of the cellular metal floor raceways located therebeneath.

A concrete floor is poured on top of the metal floor decking and over the closed top plate of the limited access feeder raceway up to the floor level.

Numerous objects, features and advantages of the present invention will be readily apparent to those skilled in the art upon a reading of the following disclosure when taken in conjunction with the accompanying drawings.

BRIEF DESCRIPTION OF THE DRAWINGS

FIG. 4 is an isometric partially cutaway view of a floor construction including the limited access feeder raceway of FIG. 1 laid transversely across a cellular metal floor decking with a concrete floor poured on top of the decking and feeder raceway.

FIG. 5 is a section elevation view taken along line 5—5 of FIG. 1 showing the details of construction of the access unit.

DETAILED DESCRIPTION OF THE PREFERRED EMBODIMENTS

Figure 1:
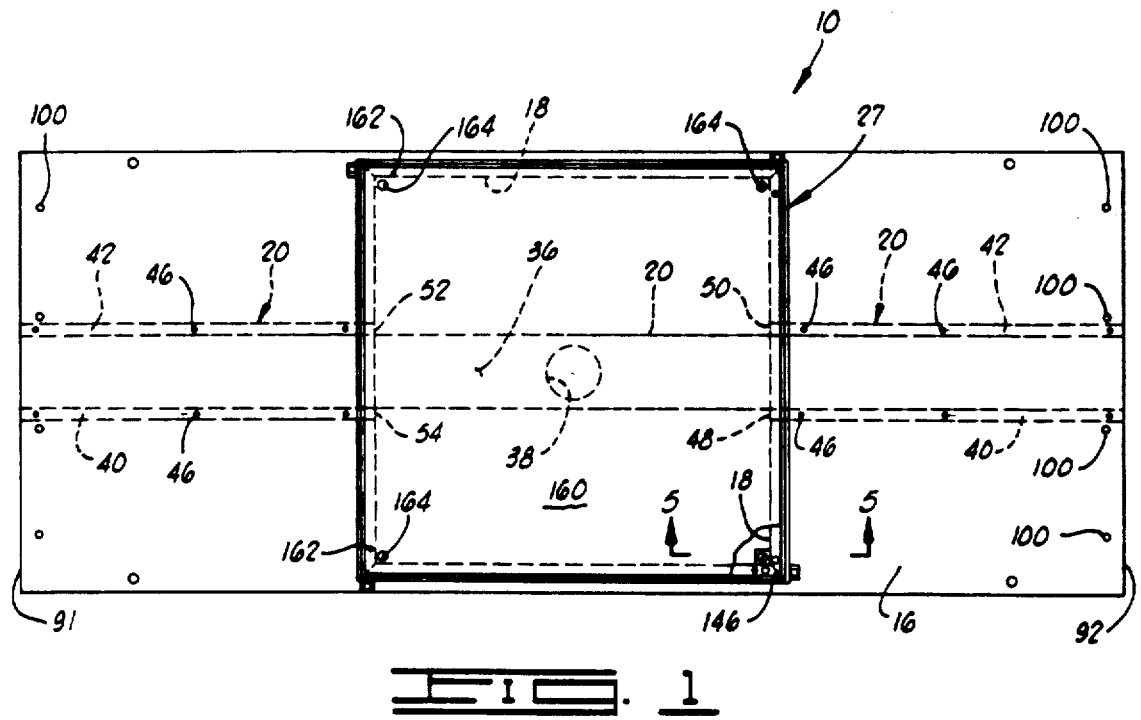
FIG. 1 is a plan view of a segment of limited access feeder raceway including one access opening and one access unit.
Figure 2:
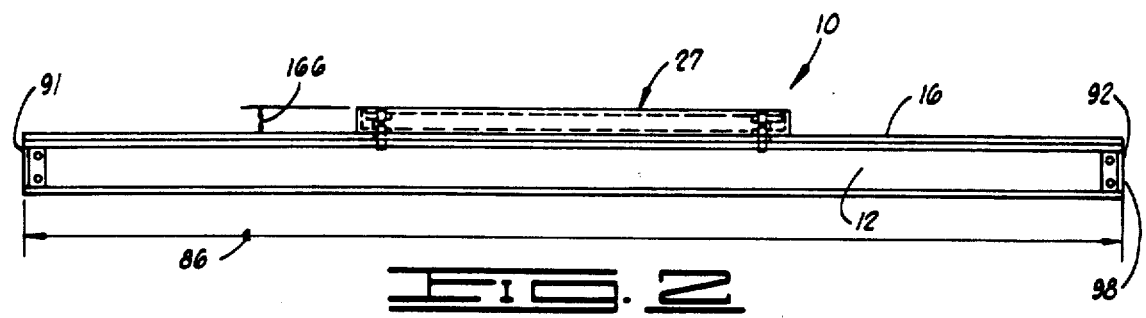
FIG. 2 is a side elevation view of the raceway segment of FIG. 1.
Figure 3:
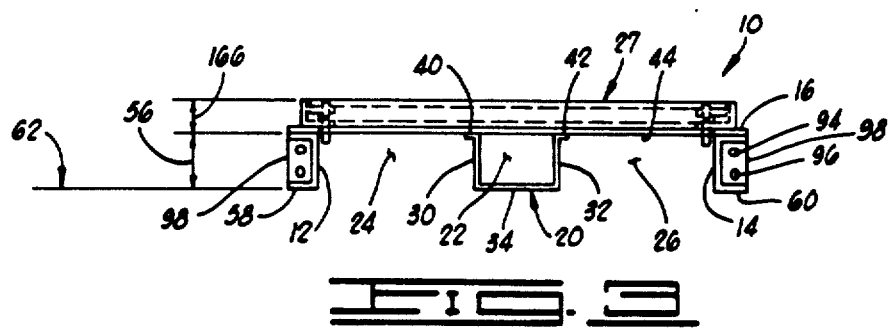
FIG. 3 is an end elevation view of the raceway segment of FIG. 1.

Referring now to the drawings, and particularly to FIGS. 1-3, a limited access feeder raceway segment is thereshown and generally designated by the numeral 10. The feeder raceway segment 10 includes first and second spaced-apart, substantially parallel channel-shaped side rails 12 and 14. A single or unitary closed top plate 16 spans the side rails and is fixedly attached thereto. The top plate 16 has a square access opening 18 defined therethrough.

An elongated upwardly open, channel-shaped raceway enclosure and divider means 20 extends generally parallel to the side rails 12 and 14 and is attached to and extends downward from the top plate 16, thus defining an enclosed first wiring raceway 22. As best seen in FIG. 3, the raceway enclosure 20 separates a space between side rails 12 and 14 into bottomless second and third raceways 24 and 26 located on opposite sides of the enclosed first wiring raceway 22.

An access means or access unit 27 is fixedly attached to the top plate 16 and extends upward therefrom for providing access from a floor level 28 (see FIG. 4) downward through the access opening 18 into the first, second and third raceways 22, 24 and 26.

As best seen in FIG. 3, the side rails 12 and 14 are permanently attached to the top plate 16 by means such as welding, riveting or other suitable means. It is noted that it would be possible to construct the top plate 16 and the side rails 12 and 14 in an integral fashion such as by forming the same from a single sheet of metal.

The channel-shaped raceway enclosure means 20 has first and second flanges 30 and 32 which are attached to and extend downward from top plate 16 to define side walls 30 and 32 of the enclosed first wiring raceway 22. The raceway enclosure means 20 further includes a web 34 extending between lower ends of flanges 30 and 32 to define a bottom wall 34 of the enclosed first wiring raceway 22.

As best seen in FIG. 1, the raceway enclosure means 20 spans the access opening 18. The top plate 16 defines a top wall of the enclosed first wiring raceway 22 except at the access opening 18 where a top 36 of enclosed first wiring raceway 22 is open to permit access thereto.

A portion of the web 34 of channel-shaped raceway enclosure means 20 spanning the access opening 18 has a circular wiring opening 38 defined therein. The wiring opening 38 is located directly below the access opening 18.

As best seen in FIG. 3, the raceway enclosure means 20 includes horizontally outward extending lips 40 and 42 defined on the upper ends of flanges 30 and 32. The lips 40 and 42 abut a lower surface 44 of top plate 16 and are permanently attached thereto by spot welds 46. As best seen in FIG. 1, the lips 40 and 42 terminate at edges 48, 50, 52 and 54 adjacent access opening 18.

The flanges 30 and 32, web 34 and lips 40 and 42 of raceway enclosure 20 are preferably integrally constructed.

The side rails 12 and 14 and raceway enclosure means 20 have equal fixed vertical heights 56 so that the web 34 of enclosure means 20 and lower edges 58 and 60 of side rails 12 and 14 lie in a common plane 62.

Turning now to FIG. 4, an isometric view is thereshown of a floor construction generally designated by the numeral 64 which includes the limited access feeder raceway segment 10.

The floor construction 64 includes a corrugated metal floor decking generally indicated by the numeral 66. The metal floor decking 66 includes a plurality of parallel, multi-cell cellular metal floor raceways such as 68 and 70.

For example, the first multi-cell cellular metal floor raceway 68 includes a bottom plate 71 which defines three adjacent parallel closed cells 72, 74 and 76.

Similarly, cellular metal floor raceway 70 has a bottom plate 78 defining first, second and third cells 80, 82 and 84.

Typically, of the three cells 80, 82 and 84, the middle cell 82 will be designated for high voltage power wiring, and the adjacent cells 80 and 84 will be utilized for communication wiring and computer wiring, respectively. At intervals along the lengths of the cellular metal floor raceways 68 and 70, first wiring openings such as 86, 88 and 90 will be defined in the top of the cells. These first wiring openings 86, 88 and 90 are placed so that they will be intersected by the raceways 24, 22 and 26, respectively, of the feeder raceway segment 10.

The feeder raceway segment 10 preferably has a length 87 (see FIG. 2) equal to an interval 89 (see FIG. 4) between adjacent cellular metal floor raceways such as 68 and 70.

The feeder raceway segment 10 is then located upon the metal floor decking 66 so that the access unit 27 and wiring opening 38 are centered upon the cellular metal floor raceway 68 with the wiring opening 38 located directly above and in registry with an opening such as 88 in the top of the middle cell 74 of cellular metal floor raceway 68. The wiring opening 38 in the bottom 34 of raceway enclosure 20 can generally be referred to as a second wiring opening 38 defined through the bottom of enclosed first wiring raceway 22, which is located directly above and in registry with the first wiring opening 88 of the high voltage power wiring cell 74.

An advantage of the limited access feeder raceway segment 10 having only one enclosed raceway 22 and having the two bottomless raceways 24 and 26 is that only one wiring access hole 38 needs to be aligned with wiring access holes such as 88 in the cellular metal decking. Then whatever other access openings, such as openings 86 and 90, are provided in the cellular metal floor raceway can easily be accessed through the bottomless raceways 24 and 26 of the feeder raceway segment 10. This is contrasted to prior art limited access systems which have completely enclosed raceways so that wiring access openings in the bottom of all three raceways of the feeder raceway must be aligned with corresponding openings in the cellular metal floor raceways.

The lower edges 58 and 60 of the side rails 12 and 14 of feeder raceway segment 10 are typically welded to the top of the metal floor decking 66.

Although only one of the feeder raceway segments 10 is shown in FIG. 4, it will be understood that a plurality of those segments 10 will be placed end to end, with each segment 10 having its access unit 27 centered over the openings 86, 88 and 90 of one of the cellular metal floor raceways such as 68 or 70.

Ends such as the ends 91 and 92 of feeder raceway segment 10 are designed to be abutted together and connected by means of threaded fasteners which are placed in holes such as 94 and 96 (see FIG. 3) in angle-shaped pieces 98 located flush with the ends 91 and 92.

Additionally, across the top of top plate 16 near the ends 91 and 92 are a plurality of holes 100. A channel-shaped connector (not shown) is laid across the abutted ends of the feeder raceway segments 10 and fastened thereto by threaded fasteners extending down into the openings 100 so as to further reinforce the connection between adjacent feeder raceway segments 10.

Additionally, if the interval 89 between adjacent cellular metal floor raceways 68 and 70 is greater than the length of the feeder raceway segments 10, blank sections of feeder raceway which do not include an access unit 27 can be placed between feeder raceway segments 10 so as to provide an appropriate interval between access units 27 equivalent to the interval 89 between the cellular metal floor raceways in the particular metal floor decking 66 being utilized.

A concrete floor 102 is poured on top of the metal floor decking 66 and over the enclosed top plate 16 of the limited access feeder raceway segment 10 up to the floor level 28. Preferably, a layer of reinforcing material 104, which may be wire mesh, or reinforcing bar, is imbedded in the concrete floor 102 and extends across and above the closed top plate 16 of the feeder raceway segment 10 except at the locations of the access units 27. This provides for a greatly increased floor strength as compared to that which can be achieved with conventional trench duct which extends the entire depth of the floor along the entire length of the feeder trench duct.

A height 166 of access unit 27 corresponding to a thickness of concrete 102 over the top of top plate 16 will be in a range from about 1¼ inches to about 3¼ inches. The reinforcing steel 104 will typically be located from ¼ to 1 inch below the surface 28 of the concrete 102. As is apparent in FIG. 4, the top walls such as 106, 108 and 110 of each of the cells 80, 82 and 84 of the multi-cell cellular metal floor raceways lie in a common plane so that the lower edges 58 and 60 of channel members 12 and 14 and the bottom 34 of raceway enclosure 20 lie across and engage the top walls 106, 108 and 110 of each cell.

When the concrete floor 102 is poured, various trapezoidal-shaped filler blocks (not shown) are placed in the troughs of the metal floor decking 66 immediately under the side rails 12 and 14 to prevent cement from entering the bottomless second and third wiring raceways 24 and 26 of the feeder raceway segment 10.

Turning now to FIG. 5, the details of construction of the access unit 27 will be described. The access unit 27 includes a generally rectangular access frame or access unit pan 112. A rectangular inner opening 114 is defined through pan 112 along an innermost edge 116 of the angular cross section member 118 from which the pan 112 is formed. This rectangular inner opening 114 also generally corresponds to the access opening 18.

The pan 112 includes four pan adjustment screw brackets 120 which are welded or otherwise fixedly attached to the angle-shaped members 118 and which protrude into the generally rectangular opening 114.

The pan 112 has four ears 122 extending outward at the corners thereof through which screws 125 are placed to hold the pan 112 in place on top plate 16.

A generally rectangular trim rail 124 is adjustably supported from pan 112 by four trim adjustment means 126 located at the four corners of the pan 112. Trim adjustment means 126 are used to adjust a height 128 of the trim rail 124 relatively to the pan 112. A layer of porous foam gasket material 130 is glued to the outer wall of trim rail 124 and slides against the vertical wall of pan 112.

Each of the trim adjustment means 126 includes a threaded bolt 132 having an annular shoulder 134 defined above a threaded portion 136, and having a head 138. The bolt 132 is received in a threaded bore 140 of pan adjusting screw bracket 120.

A rail assembly adjustment bracket 142 has an opening 144 therein which is freely received about bolt 132 and rests on top of annular shoulder 134. There are four such brackets 142, one in each corner.

The previously mentioned square trim rail 124 is formed of four side rail pieces, the ends of which abut each other as indicated at 146 in FIG. 1. Thus, the ends of two of the side rail pieces of trim rail 124 rest upon each of the rail assembly adjustment brackets 142. A threaded screw 148 connects each side rail piece of trim rail 124 to the rail assembly adjustment bracket 142 at each corner.

Thus, to raise the trim rail 124 and thereby adjust the height 128 thereof above the pan 112, the bolts 132 are rotated thus raising the rail assembly adjustment brackets 142 and the trim rail 124.

A snap retainer ring 150 is disposed about each of the bolts 132 above its associated rail assembly adjustment bracket 142.

The trim rail 124 has a groove 152 defined therein within which is received a cover plate gasket 154.

In each corner, a tile trim spacer 156 lies freely on top of the trim rail 124 with an opening 158 freely received about the head 138 of bolt 132.

Finally, a square cover plate 160 fits relatively closely within the vertical walls of trim rail 124 and is attached to the trim rail 124 by four screws 162 (see FIG. 1) which thread downward into holes (not shown) in the trim rail 124 to hold the cover plate 160 in place.

As is apparent in FIG. 1, the cover plate 160 has four openings 164 defined therein through which the heads 138 of bolts 132 can be accessed to rotate the same and thus adjust the height of the trim rail 124 and cover plate 160 relative to the pan 112.

When electrical cables are to be pulled into the feeder raceway segment 10, the cover plates 160 are removed to allow access down through the access openings 18 into the wiring raceways 22, 24 and 26 of limited access feeder raceway segment 10 and into the cells such as 72, 74 and 76 of the cellular metal floor raceways such as 68.

EMBODIMENT OF FIG. 6

Figure 6:
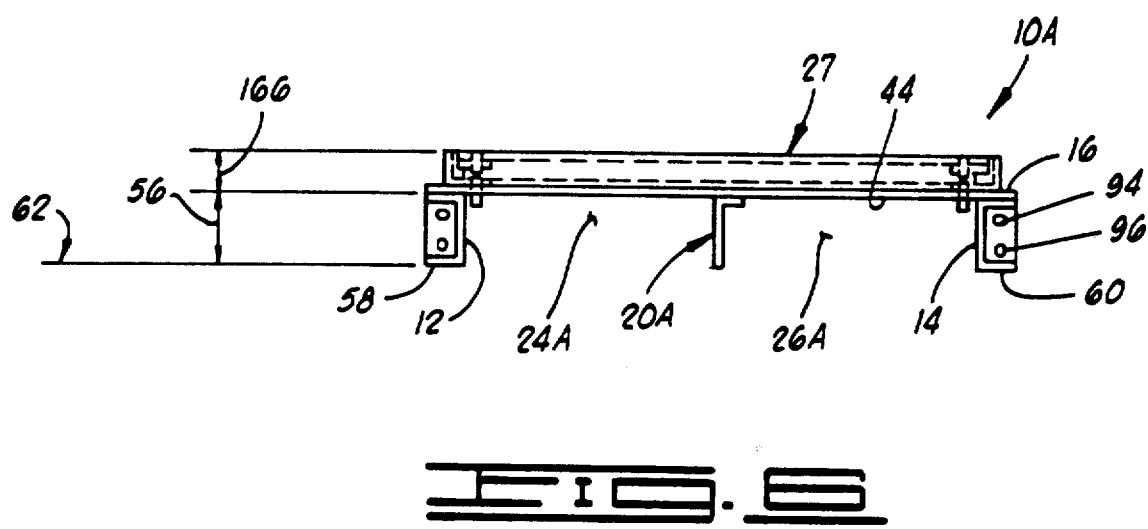
FIG. 6 is a view similar to FIG. 3 showing an alternative embodiment of the feeder raceway having only two raceways defined therein.

Some electrical systems utilize only two different types of wiring and thus require only two separate raceways instead of three. FIG. 6 illustrates an alternative embodiment of the limited access feeder raceway designated generally as 10A.

The raceway 10A of FIG. 6 is generally the same as the raceway segment 10 of FIG. 3, except that the raceway enclosure and divider means 20 has been replaced with a simple raceway divider means 20A. There are only two raceways defined in the limited access raceway segment 10A, namely the two bottomless raceways 24A and 26A.

The other parts of raceway segment 10A of FIG. 6 are the same as the corresponding parts of raceway segment 10 of FIG. 3 and are indicated with like numerals.

The limited access feeder raceway 10A of FIG. 6 would be utilized with a cellular metal flooring system like that shown in FIG. 4, except that the wiring openings 86 and 90 would be aligned so that both could be accessed through raceway 24A, and wiring opening 88 would be placed for access through raceway 26A.

Thus it is seen that the apparatus of the present invention readily achieves the ends and advantages mentioned as well as those inherent therein. While certain preferred embodiments of the invention have been illustrated and described for purposes of the present disclosure, numerous changes in the arrangement and construction of parts may be made by those skilled in the art which changes are encompassed within the scope and spirit of the present invention as defined by the appended claims.

What is claimed is:

1. A floor construction comprising:
  a metal floor decking including a plurality of parallel multi-cell cellular metal floor raceways each including a plurality of cells each of which cells has a top wall, and all of said top walls lying in a common plane, at least one cell of each raceway having a first wiring opening defined in said top wall thereof;
  a limited access raceway transversely spanning and resting upon said top walls of said cells of said cellular metal floor raceways, said limited access raceway including:
    an enclosed first wiring raceway separating bottomless second and third wiring raceways, said enclosed first wiring raceway having a plurality of spaced second wiring openings defined through a bottom thereof, said bottom resting upon said top walls of said cells, one of said second wiring openings being located directly above and in registry with one of said first wiring openings;
    a closed raceway top having a plurality of spaced access openings defined therethrough, one of said second wiring openings being located below each of said access openings;
    a plurality of access means, one associated with each access opening, extending upward from said closed raceway top to about a floor level, for providing access downward through said access openings into said first, second and third wiring raceways of said limited access raceway and into said cells of said multi-cell cellular metal floor raceways; and
  a concrete floor poured on top of said metal floor decking and over said closed raceway top of said limited access raceway up to said floor level.

2. The floor construction of claim 1, further comprising:
  a layer of reinforcing material embedded in said concrete floor above said closed raceway top of said limited access raceway.

3. The floor construction of claim 1, wherein:
  said enclosed first wiring raceway spans each of said access openings, said closed raceway top defining a top wall of said enclosed first wiring raceway except at said access openings where a top of said enclosed first wiring raceway is open to permit access thereto.

4. The floor construction of claim 1, wherein:
  said limited access raceway has a fixed vertical height of said closed raceway top.

5. A limited access raceway apparatus to be placed in a floor, comprising:
  first and second spaced apart substantially parallel side rails;
  a unitary top plate spanning said side rails and fixedly attached thereto, said top plate having an access opening defined therethrough;
  an elongated raceway divider means, being channel shaped having first and second flanges attached to and extending downward from said top plate and a web intermediate said flanges at their lower ends thereby defining an enclosed raceway, said enclosed raceway extending parallel to said side rails and separating a space between said side rails into two bottomless raceways located on opposite sides of said enclosed raceway and divider means, a portion of said web of said enclosed raceway and divider means spanning said access opening of said unitary top plate and having a wiring opening defined therein, said wiring opening being located directly below said access opening; and
  an access means, fixedly attached to said top plate at said access opening and extending upward therefrom, for providing access from a floor level downward through said access opening into said two bottomless raceways.

6. The apparatus of claim 5, wherein: said flanges and said web of said channel shaped raceway enclosure and divider means are integrally constructed.

7. The apparatus of claim 5, wherein:
  said side rails and said raceway enclosure and divider means have equal fixed vertical heights so that said web of said enclosure and divider means and lower edges of said side rails lie in a common plane.

8. The apparatus of claim 5, wherein:
  said raceway enclosure and divider means includes horizontally outward extending lips defined on upper ends of said flanges, said lips abutting a lower surface of said top plate and being attached thereto.

9. The apparatus of claim 8, wherein;
  said lips of said raceway enclosure and divider means terminate adjacent said access opening.

* * * * *